United States Patent
Ke et al.

(10) Patent No.: US 9,350,736 B2
(45) Date of Patent: May 24, 2016

(54) SYSTEM AND METHOD FOR ISOLATING MOBILE DATA

(71) Applicants: Bluedon Information Security Technology Company (Co.), Ltd., Guangzhou (CN); Bluedon Information Security Technology Corporation, Ltd., Guangzhou (CN)

(72) Inventors: Zonggui Ke, Guangzhou (CN); Yubin Yang, Guangzhou (CN); Liming Cheng, Guangzhou (CN)

(73) Assignees: Bluedon Information Security Technology Corporation, Ltd., Guangzhou (CN); Bluedon Information Security Technology Co., Ltd., Guangzhou (CN)

( * ) Notice: Subject to any disclaimer, the term of this patent is extended or adjusted under 35 U.S.C. 154(b) by 0 days.

(21) Appl. No.: 14/369,238

(22) PCT Filed: Mar. 14, 2013

(86) PCT No.: PCT/CN2013/000281
§ 371 (c)(1),
(2) Date: Jun. 27, 2014

(87) PCT Pub. No.: WO2014/067222
PCT Pub. Date: May 8, 2014

(65) Prior Publication Data
US 2015/0012978 A1   Jan. 8, 2015

(30) Foreign Application Priority Data
Oct. 31, 2012   (CN) .......................... 2012 1 0428682

(51) Int. Cl.
*G06F 7/04*      (2006.01)
*G06F 21/00*    (2013.01)
(Continued)

(52) U.S. Cl.
CPC ............... *H04L 63/10* (2013.01); *H04W 12/08* (2013.01); *H04L 63/105* (2013.01); *H04L 63/20* (2013.01)

(58) Field of Classification Search
CPC ........ H04L 63/10; H04L 63/20; H04W 12/08
USPC .......................................................... 726/4
See application file for complete search history.

(56) References Cited

U.S. PATENT DOCUMENTS

7,725,501 B1 *   5/2010   Stillman et al. ................ 707/805
8,161,281 B1 *   4/2012   Johnson et al. ................ 713/166
(Continued)

*Primary Examiner* — Dede Zecher
*Assistant Examiner* — Abdullah Almamun
(74) *Attorney, Agent, or Firm* — Coats & Bennett, P.L.L.C.

(57) ABSTRACT

Disclosed is a system for mobile data isolation, comprising of a tag control management module and a mobile data management module. The tag control management module comprises a tag generator, a tag storage management module and a tag transmission control module. The mobile data management module primarily identifies user authority and data confidentiality level according to tags, operates and controls the mobile application of mobile data, to realize fine-grained confidentiality security protections of the mobile data. The mobile data management module is divided into security isolation control of a data processing process, security control of a data transmission process and security isolation control in data storage. Meanwhile, a method for mobile data isolation is also disclosed. Isolation and fine-grained operation and control of data on a mobile intelligent terminal can be performed effectively, realizing different confidentiality policies and ensuring the confidentiality security of mobile data.

10 Claims, 5 Drawing Sheets

(51) Int. Cl.
*H04L 29/06* (2006.01)
*H04W 12/08* (2009.01)

(56) References Cited

U.S. PATENT DOCUMENTS

| | | | |
|---|---|---|---|
| 9,063,811 B2* | 6/2015 | Stekkelpak | G06F 9/44505 |
| 9,173,055 B2* | 10/2015 | Ngo | H04W 4/02 |
| 2002/0073072 A1* | 6/2002 | Fukumoto | 707/1 |
| 2003/0105979 A1* | 6/2003 | Itoh et al. | 713/201 |
| 2004/0015701 A1* | 1/2004 | Flyntz | 713/182 |
| 2011/0277038 A1* | 11/2011 | Sahita et al. | 726/27 |
| 2012/0185911 A1* | 7/2012 | Polite et al. | 726/1 |
| 2014/0325684 A1* | 10/2014 | Takeyasu | 726/29 |

\* cited by examiner

SYSTEM AND METHOD FOR ISOLATING MOBILE DATA

CROSS-REFERENCE TO RELATED APPLICATIONS

The present application claim priority under 35 U.S.C. 398 to PCT Application PCT/CN2013/000281, filed on Mar. 14, 2013, which claims priority to Chinese Patent Application CN201210428682.7, filed on Oct. 31, 2012, the content of both of which are hereby incorporated by reference in its entirety.

TECHNICAL FIELD

The present application relates to the technical field of information security, and especially to a system and method for mobile data isolation.

BACKGROUND ART

With the rising of BYOD and the increasing of business processing with mobile intelligent terminals in the government and enterprises, more and more importance is being placed on the problem of data security confidentiality on mobile intelligent terminals. However, with office applications and private applications running on the same mobile intelligent terminal, once a mobile application reads and modifies government and enterprise data without being authorized, it could result in leak of government or enterprise secrets, causing security threats. Now, it is urgent to effectively control data reading and processing on the mobile intelligent terminal, so as to ensure the security confidentiality thereof.

Existing MDM product for mobile terminal data protection mainly is the CHINASEC mobile security management platform of MING CHAO WAN DA company, which is primarily realized via file encryption and VPN security transmission. All the data sent from the intranet to the mobile terminal is encrypted, and the mobile terminal can operate on the data on condition of having been authenticated by the password input at the client end of the product.

This technique cannot perform fine-grained discrimination and isolation on the data so far. All the data is transmitted to the mobile intelligent terminal after being encrypted by a mobile gateway, and all the applications pushed to the mobile intelligent terminal by the mobile gateway can operate on the data. Data confidentiality is ensured merely by uniform encryption and VPN transmission, and it can neither implement different protection policies for different types of data nor define the operation authority of different mobile applications for different data. Once an illegally authorized application is pushed by mistake, this application will have the authority to read all the data. In addition, it will consume a large amount of resources to perform the encryption and VPN transmission method on all the data transmitted to the mobile intelligent terminal via the mobile gateway.

Existing personal mobile terminal data protection products are mainly Tencent Mobile Manger, 360 Mobile Phone Security Guard, etc., all of which use the method of file confidentiality box. A user puts the designated data into the "safe box"; and when a mobile application accesses the data, authority authentication (the user inputs a password for authentication) is performed on the application, and the application is authorized to operate all the data after being discriminated, so as to realize control of mobile data confidentiality.

This technique can only realize coarse-grained control of data so far. Not only each piece of sensitive data is required to be added to the file confidentiality box by the user manually, but also the user has to input the password manually every time using the sensitive data. The confidentiality levels of data are very monotonous, which are only divided into 2 levels of "secret" and "non-secret"; the confidentiality of data is not strong either, and once the password is leaked, or other applications obtain the data operation authority via a certain mobile application, none of the data will be protected effectively; in addition, the sensitive data can only be protected on the mobile terminal, and once being sent out of the current mobile terminal by an application which has obtained legal authority, the sensitive data will not be able to be protected any more.

SUMMARY

An objective of the present disclosure is to provide a system and method for mobile data isolation so as to overcome the defects of the prior art, which ensure security isolation and complete confidentiality of data in a mobile intelligent terminal.

A system for mobile data isolation comprises a memory and one or more processors in which a tag control management module and a mobile data management module are implemented. The tag control management module comprises a tag generator implemented in a tag generator circuit, a tag storage management module implemented in a tag storage management circuit and a tag transmission control module implemented in a tag transmission control circuit. The tag generator comprises a data tag (data-tag) generator and a mobile application tag (app-tag) generator. The tag storage management module is informed after generation or change of the data tag (data-tag) and mobile application tag (app-tag) is completed. The tag storage management module is responsible for storing the data tag (data-tag) and the mobile application tag (app-tag). And the tag transmission control module comprises transmission management of the data-tag and transmission synchronization management of the app-tag.

The mobile data management module identifies user authority and data confidentiality level according to a tag, and operates and controls the mobile application of mobile data, so as to realize fine-grained confidentiality security protection of the mobile data.

The mobile data management module comprises a security isolation control module implemented on a security isolation control circuit for controlling a data processing process, and a security control module implemented on a security control circuit for controlling a data transmission process security isolation control in data storage. The security isolation control of the data processing process is implemented on a mobile intelligent terminal and a mobile access gateway. The security control of the data transmission process comprises data security control performed in two situations of a process whereby the data is transmitted from the mobile access gateway to the mobile intelligent terminal and of a process whereby the data is transmitted from the mobile intelligent terminal to the exterior; the security isolation control in the data storage isolates static data on a mobile terminal; if a data access message notification is received, a security isolation control module (implemented in the security isolation control circuit) in the data processing process is informed immediately; and if a data transmission message notification is received, a security control module (implemented in the security control circuit) in the data transmission process is informed immediately.

Preferably, the tag storage management module is also responsible for the operation maintenance of three databases of a mobile device data-tag database, a mobile device app-tag database and a mobile access gateway app-tag database.

Preferably, the data tag (data-tag) generator (implemented in the tag generator circuit) is responsible for generating a tag for the mobile data, and is divided into two portions of a mobile intelligent terminal data-tag generator and a mobile access gateway data-tag generator; and a data-tag database is provided at the mobile intelligent terminal, and no data-tag database is provided at the mobile access gateway.

Preferably, the mobile application tag (app-tag) generator (implemented in the tag generator circuit) is mainly responsible for generating a tag for the mobile application, and is divided into two portions of a mobile intelligent terminal app-tag generator and a mobile access gateway app-tag generator; and both of the mobile intelligent terminal and the mobile access gateway have an app-tag database.

Preferably, the mobile intelligent terminal data-tag generator is responsible for creating and modifying a data-tag for corresponding data at the mobile intelligent terminal; and the mobile access gateway data-tag generator is responsible for directly transmitting the data to the mobile terminal, without storing same in the database, after the data-tag corresponding to the data is generated at the mobile access gateway.

Preferably, the mobile application tag (app-tag) can only be modified at the access gateway, and is then encrypted and pushed to a corresponding mobile intelligent terminal user after being modified; and the mobile intelligent terminal does not make any modification to the app-tag.

Preferably, the data-tag transmission management is responsible for processing the data-tag synchronously encrypted and transmitted with the corresponding data; the app-tag transmission synchronization management is divided into app-tag creation transmission management and app-tag synchronization transmission management, is responsible for processing the app-tag synchronously encrypted with a corresponding application and transmits the app-tag to the mobile intelligent terminal used by "app. user id using the app" designated by the tag; and the tag transmission is one-way transmission from the mobile access gateway to the mobile intelligent terminal.

Preferably, the particular steps of an authority confirmation algorithm used in the data processing process are as follows:
input: the app-tag and the data-tag; output: Yes or No
1. viewing "app. operation authority", and reading the data confidentiality level at which a user operates using the app;
2. viewing all the "data-tag. data-use authorities", and reading the highest data-use authority;
3. comparing the level of the "app. operation authority" with that of the highest "data-tag. data-use authority"; if the former is greater than or equal to the latter, returning Yes; and if the former is smaller than the latter, returning No.

Preferably, the particular steps of transmitting the data from the mobile access gateway to the mobile intelligent terminal are as follows:
transmitting the data from an intranet to a security isolation storage area of the mobile access gateway, and informing the tag generator of the tag control management module and waiting for a tag generator feedback message;
acquiring the tag generator feedback message, and then selecting an appropriate encryption method and transmission method according to the "data-tag. confidentiality level"; and
coordinating with the tag control management module, and sending the data together with the corresponding data-tag to the mobile intelligent terminal;

the particular steps that the data is transmitted from the mobile intelligent terminal to exterior are as follows:
receiving a data transmission application of the mobile intelligent terminal, then informing the tag storage management module of the tag control management module, and returning, from the data-tag database, a data-tag tag corresponding to the data;
invoking the authority confirmation algorithm of the security control module in the data processing process, and judging whether the user has the authority to perform this transmission operation; and
if yes, selecting an appropriate encryption method and transmission method according to the "data-tag. confidentiality level" to transfer the data out of the device.

A method for mobile data isolation is also provided in the present disclosure. The method creates a confidentiality level and use authority of data by generating a data tag (data-tag), and generates a mobile application tag (app-tag) when a mobile application (app) is pushed out; and the mobile application (app) is also provided with a corresponding operation authority, which realizes matching between the operation authority of the mobile application tag (app-tag) and the data tag (data-tag) via an authority confirmation algorithm, thus realizing that data of the corresponding confidentiality level and use authority can be operated by a mobile application (app) of the corresponding operation authority and realizing fine-grained security isolation of data; and the particular steps are:

S1: data transmitted from an intranet generates a data tag (data-tag) via a mobile gateway tag generator, and sets the confidentiality level and user authority of the data-tag according to a mobile access gateway data-tag creation algorithm, and informs a tag transmission control module;

S2: the tag transmission control module encrypts the tag (data-tag), sends it to a mobile intelligent terminal in the most secure way, and then informs a security control module in a data transmission process in a mobile data management module to encrypt the data correspondingly according to the confidentiality level indicated by the data-tag of the data and send same to the mobile intelligent terminal in a corresponding secure way according to the confidentiality level indicated by the data-tag;

S3: the mobile intelligent terminal receives the data and the data-tag, then invokes the tag transmission control module for decryption, and informs the tag generator thereafter;

S4: the tag generator acquires a data storage address from a security isolation module in data storage in the mobile data management module, invokes a mobile intelligent terminal data-tag modification algorithm to generate a final data-tag and informs a tag storage management module;

S5: the tag storage management module stores the data-tag in a data-tag database;

S6: the application (app) pushed out from the intranet generates a mobile application tag (app-tag) via the mobile access gateway tag generator, sets, according to the mobile access gateway app-tag creation algorithm, an identifiable identifier of the mobile application tag (app-tag), a user id, an operation authority and the confidentiality level of the generated data and informs the tag storage management module;

S7: if the mobile application (app) is newly created, the tag storage management module is informed to store the generated mobile application tag (app-tag) in an app-tag database, and then the tag transmission control module is informed to encrypt the tag (app-tag) and send same together with the app corresponding thereto to the mobile intelligent terminal in a secure way; if the mobile application (app) changes, the corresponding mobile application tag (app-tag) is modified at the mobile access gateway, the tag storage management module of the mobile access gateway is informed to update the app-tag database, and then the tag transmission control module is informed to encrypt the mobile application tag (app-tag) and send same to the mobile intelligent terminal in a secure way;

S8: the mobile intelligent terminal receives the pushed app and the app-tag, then invokes the tag transmission control module for decryption, and informs the tag storage management module thereafter;

S9: the tag storage management module stores the app-tag in the app-tag database; and S10: matching between the operation authority of the app-tag and the data-tag is realized through the authority confirmation algorithm, thus realizing that data of the corresponding confidentiality level and use authority can be operated by an app of the corresponding operation authority, and realizing security isolation of data fine grain.

Preferably, creation and modification for the data-tag of corresponding data of the mobile intelligent terminal are respectively realized by a mobile intelligent terminal data-tag generator creation algorithm and a mobile intelligent terminal data-tag generator modification algorithm;

situations of using the mobile intelligent terminal data-tag generator creation algorithm: scenarios of generating data, merging data, replicating data and backing up data:

generating data and merging data—according to the application "app-tag. confidentiality level of the generated data" which operates the data, selecting the highest confidentiality level from the "tag. confidentiality levels" of all the data read by the application which operates the data as the "tag. confidentiality level" of the generated data; the position of the new data is recorded to the "tag. data storage address"; and the "tag. user authority" adopts the smallest authority level according to the "tag. user authority" of all data used by the application, and if there is no data being used, the "tag. user authority" is set as an authority whereby the current user can read and write.

Replicating data and backing up data—creating a new data-tag, and recording the position of the new data to the "tag. data storage address"; replicating the "tag. confidentiality level" of the original data; and replicating the "tag. user authority" of the original data.

The mobile intelligent terminal data-tag generator modification algorithm:

situations of using the modification algorithm: scenarios of receiving data from the mobile gateway, modifying the original data and data being transferred in the current device:

receiving data from the mobile gateway—filling the "tag. data storage address".

Modifying the original data—the "tag. confidentiality level" of the original data determines the "tag. confidentiality level" of the new data adopts the highest level according to the application "app-tag. the confidentiality level of the generated data" which operates the data; others are unchanged.

Transferring in the current device—modifying the "tag. data storage address".

The beneficial effects brought by the technical solution presented herein: isolation of data on a mobile intelligent terminal can be performed effectively in the present disclosure, ensuring the confidentiality security of mobile data. By means disclosed in the present disclosure, fine-grained operation and control of data on a mobile intelligent terminal can be performed effectively, realizing different confidentiality policies. The data on the mobile intelligent terminal can be authorized to a mobile application of corresponding operation authority for operation according to different confidentiality levels, ensuring isolation of data effectively. At the same time, distinct encryption and transmission policies are realized according to the different confidentiality levels of the data on the intelligent terminal, which effectively uses the limited calculation resources of the mobile intelligent terminal.

DESCRIPTION OF THE ACCOMPANYING DRAWINGS

In order to more clearly illustrate the technical solutions disclosed herein or the prior art, the figures to be used for describing the embodiments or the prior art will be outlined hereinafter, and apparently, the figures in the following descriptions are merely some embodiments, and for those skilled in the art, other figures can also be obtained according to these figures without any inventive efforts.

DETAILED DESCRIPTION

Hereinafter, the technical solutions will be clearly and completely described in conjunction with the accompanying drawings; apparently, the described embodiments are only exemplary embodiments, but not all of the embodiments. Based on the embodiments disclosed herein, all other embodiments obtained by those skilled in the art without any inventive effort all belong to the scope of protection of the present disclosure.

Provided in the present disclosure is a system for mobile data isolation; the system identifiers mobile data via a tag, identifies user authority and data confidentiality level according to the tag, and operates and controls the mobile data, so as to realize data isolation on a mobile intelligent terminal and to realize fine-grained confidentiality security protection of the mobile data.

Figure 1:
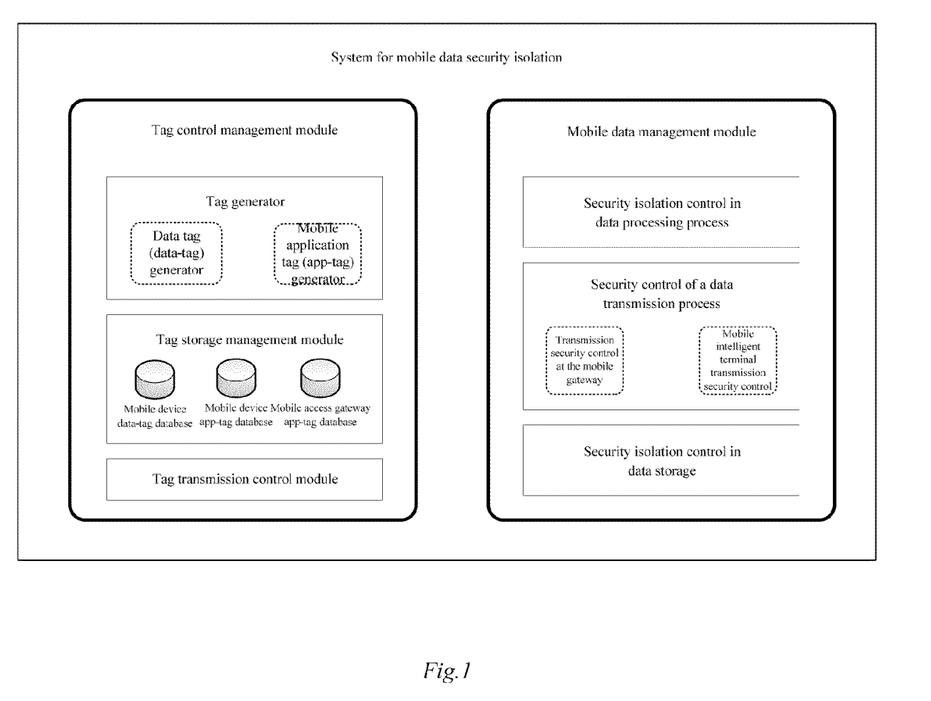
FIG. 1 is a structural diagram of a system for mobile data isolation.

FIG. 1 shows a structural diagram of the system, and the system comprises a tag control management module and a mobile data management module. The tag control management module comprises a tag generator, a tag storage management module and a tag transmission control module.

The identifier of the tag is divided into an identifier of a data tag (data-tag) and an identifier of a mobile application tag (app-tag), wherein the contents of the identifier of the data tag (data-tag) comprise:

i confidentiality level;

0-N, different levels, for confirming whether encryption/decryption and security transmission are needed.

ii data storage address; and iii data-use authority.

The contents of the identifier of the mobile application tag (app-tag) comprise:

i app id;

ii operation authority;

the data confidentiality levels that can be operated by the app, thus the usage of the data can be determined, designating programs that can be used/designating that all the applications can be used.

iii the confidentiality level of the generated data; and iv the user id using the app.

The tag generator comprises a data tag (data-tag) generator and a mobile application tag (app-tag) generator. The tag storage management module is informed after generation or change of the data tag (data-tag) and mobile application tag (app-tag) is completed.

The data tag (data-tag) generator is primarily responsible for generating a tag for the mobile data, and is divided into two portions of a mobile intelligent terminal data-tag generator and a mobile access gateway data-tag generator. A data-tag database is provided at the mobile intelligent terminal, and no data-tag database is provided at the mobile access gateway.

The mobile intelligent terminal data-tag generator is responsible for functions of creating and modifying a data-tag for corresponding data at the mobile intelligent terminal; and the mobile access gateway data-tag generator is responsible for generating a data-tag corresponding to the data at the mobile access gateway. For different tag generation situations, there are the following processing methods:

the processing methods of the mobile intelligent terminal data-tag generator are as shown in Table 1:

TABLE 1

Processing methods of the mobile intelligent terminal data-tag generator

| Serial number | Trigger state | Operation |
|---|---|---|
| 1 | Data encryption/decryption | The data-tag is unchanged |
| 2 | Data sharing | The data-tag is unchanged |
| 3 | Data destruction | A tag storage management module is informed to delete the corresponding data-tag in the database. |
| 4 | Data modification | A mobile intelligent terminal data-tag modification algorithm is invoked to modify the data-tag; and the tag storage management module is informed to modify the corresponding data-tag in the database. |
| 5 | Data replication (full replication) | A mobile intelligent terminal data-tag creation algorithm is invoked to create a data-tag; and the tag storage management module is informed to store the data-tag. |
| 6 | Data backup | The mobile intelligent terminal data-tag creation algorithm is invoked to create a data-tag; and the tag storage management module is informed to store the data-tag. |
| 7 | Partial replication (replicating a part of data) | The data-tag is unchanged (Inhibiting replicating a part of the data) |
| 8 | Data creation | The mobile intelligent terminal data-tag creation algorithm is invoked to create a data-tag; and the tag storage management module is informed to store the data-tag. |
| 9 | Data merge | The mobile intelligent terminal data-tag creation algorithm is invoked to create a data-tag; and the tag storage management module is informed to store the data-tag. |
| 10 | Data transfer | The mobile intelligent terminal data-tag modification algorithm is invoked to modify the data-tag; the tag storage management module is invoked to modify the corresponding data-tag in the database. |

The mobile access gateway invokes the mobile access gateway data-tag generator creation algorithm to create a data-tag and informs the tag transmission control module to send this data-tag together with corresponding data, before transmitting the data to the mobile intelligent terminal. The mobile access gateway directly transmits the data in an appropriate way to the mobile terminal, without storing same in the database, after generating the data data-tag.

Three algorithms are mentioned in the processing methods of the mobile intelligent terminal data-tag generator: the mobile intelligent terminal data-tag generator creation algorithm, the mobile intelligent terminal data-tag generator modification algorithm and the access gateway data-tag generator creation algorithm.

The mobile intelligent terminal data-tag generator creation algorithm:

situations of using the creation algorithm: scenarios of generating data, merging data, replicating data and backing up data.

Generating data and merging data—according to the application "app-tag. confidentiality level of the generated data" which operates the data, selecting the highest confidentiality level from the "tag. confidentiality levels" of all the data read by the application which operates the data as the "tag. confidentiality level" of the generated data; the position of the new data is recorded to the "tag. data storage address"; and the "tag. user authority" adopts the smallest authority level according to the "tag. user authority" of all the data used by the application, and if there is no data being used, the "tag. user authority" is set as an authority whereby the current user can read and write.

Replicating data and backing up data—creating a new data-tag, and recording the position of the new data to the "tag. data storage address"; replicating the "tag. confidentiality level" of the original data; and replicating the "tag. user authority" of the original data.

The mobile intelligent terminal data-tag generator modification algorithm:

situations of using the modification algorithm: scenarios of receiving data from the mobile gateway, modifying the original data and data being transferred in the current device.

Receiving data from the mobile gateway—filling the "tag. data storage address".

Modifying the original data—the "tag. confidentiality level" of the original data determines the "tag. confidentiality level" of the new data adopts the highest level according to the application "app-tag. confidentiality level of the generated data" which operates the data; others are unchanged.

Transferring in the current device—modifying the "tag. data storage address".

The mobile access gateway data-tag generator creation algorithm:

1. leaving "data-tag. data id" blank (which is set by the mobile intelligent terminal tag Generator);
2. setting "data-tag. confidentiality level" according to the origin of the data; and
3. setting "data-tag. user authority" according to the condition of the data recipient user.

The mobile application tag (app-tag) generator is primarily responsible for generating a tag for the mobile application, and is divided into two portions of a mobile intelligent terminal app-tag generator and a mobile access gateway app-tag generator. Both of the mobile intelligent terminal and the mobile access gateway have an app-tag database. The app-tag of the mobile application is generated when the mobile application is put into an "enterprise mobile application library", and is pushed to the corresponding mobile intelligent terminal user together with the mobile application. The mobile application tag (app-tag) can only be modified at the access gateway, and is encrypted and pushed to the corresponding mobile intelligent terminal user after being modified. The mobile intelligent terminal does not make any modification to the app-tag. The mobile application tag (app-tag) generator primarily has an access gateway app-tag creation algorithm.

The mobile access gateway data-tag creation algorithm:

1. setting an identifiable identifier unique to this app, and recording same to "app-tag.id";
2. recording the user id to "app-tag.user-id";
3. setting "app-tag.operation authority" of the application according to the user id; and
4. generating "app-tag. confidentiality level of the generated data" according to the user id "app-tag.user-id" and this app.

The tag storage management module is responsible for the storage of the data tag (data-tag) and the mobile application tag (app-tag), and the operation maintenance of three databases of a mobile device data-tag database, a mobile device app-tag database and a mobile access gateway app-tag database.

After receiving the notification of creating or modifying the tag informed by the tag generator, the situation where the tag storage management module operates on the database is as follows:

1. after the access gateway creates the mobile data tag, the tag transmission control module is informed at the same time;
2. when the mobile intelligent terminal creates or receives the new data-tag, the data-tag is stored in the data-tag database;
3. after the access gateway creates the mobile application tag, the newly-created app-tag is stored in the app-tag database of the access gateway, and the tag transmission control module is informed at the same time;
4. after the access gateway modifies the mobile application tag, the newly-created app-tag is stored in the app-tag database of the access gateway, and the tag transmission control module is informed at the same time;
5. after the mobile intelligent terminal receives the app-tag, the app-tag is stored in the app-tag database;
6. after the mobile terminal modifies the data-tag of the data, the data-tag database is updated; and
7 when the data is destroyed, the corresponding data-tag in the database is deleted.

Figure 2:
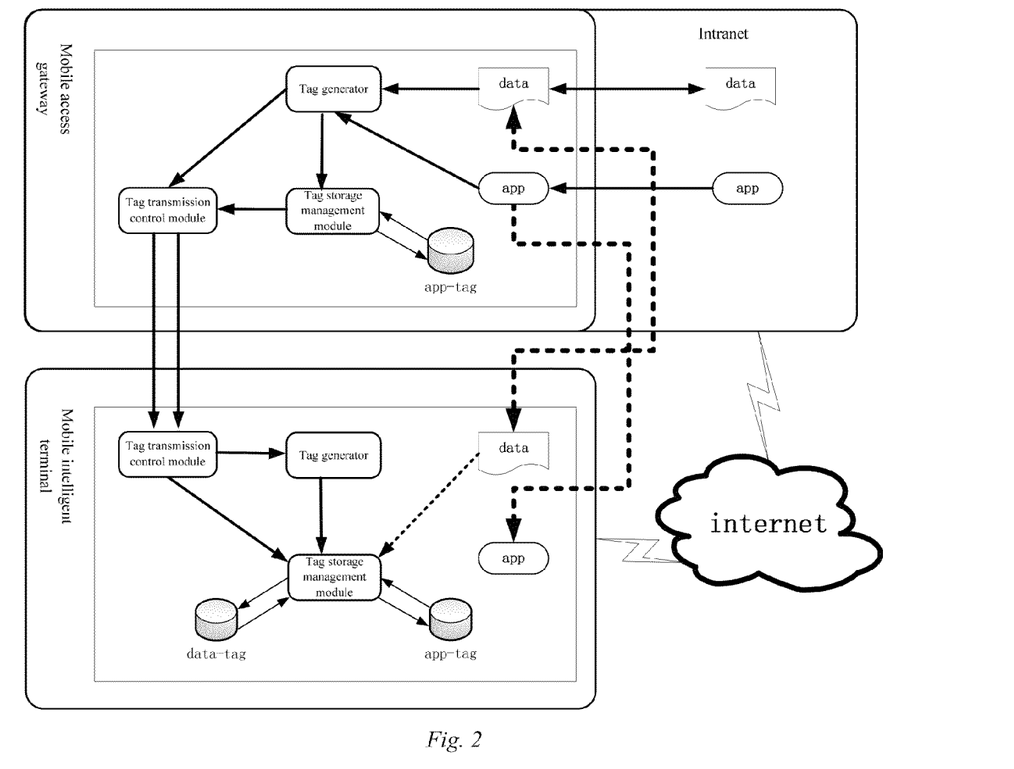
FIG. 2 is a tag transmission control schematic diagram.

FIG. 2 is a tag transmission control diagram. The tag transmission control module comprises transmission management for the data-tag and transmission synchronization management for the app-tag. The data-tag transmission management is responsible for processing the data-tag synchronously encrypted and transmitted with the corresponding data; the app-tag transmission synchronization management is divided into app-tag creation transmission management and app-tag synchronization transmission management, is responsible for processing the app-tag synchronously encrypted with a corresponding application and transmits the app-tag to the mobile intelligent terminal used by "app. user id using the app" designated by the tag. The tag transmission is one-way transmission from the mobile access gateway to the mobile intelligent terminal.

Figure 3:
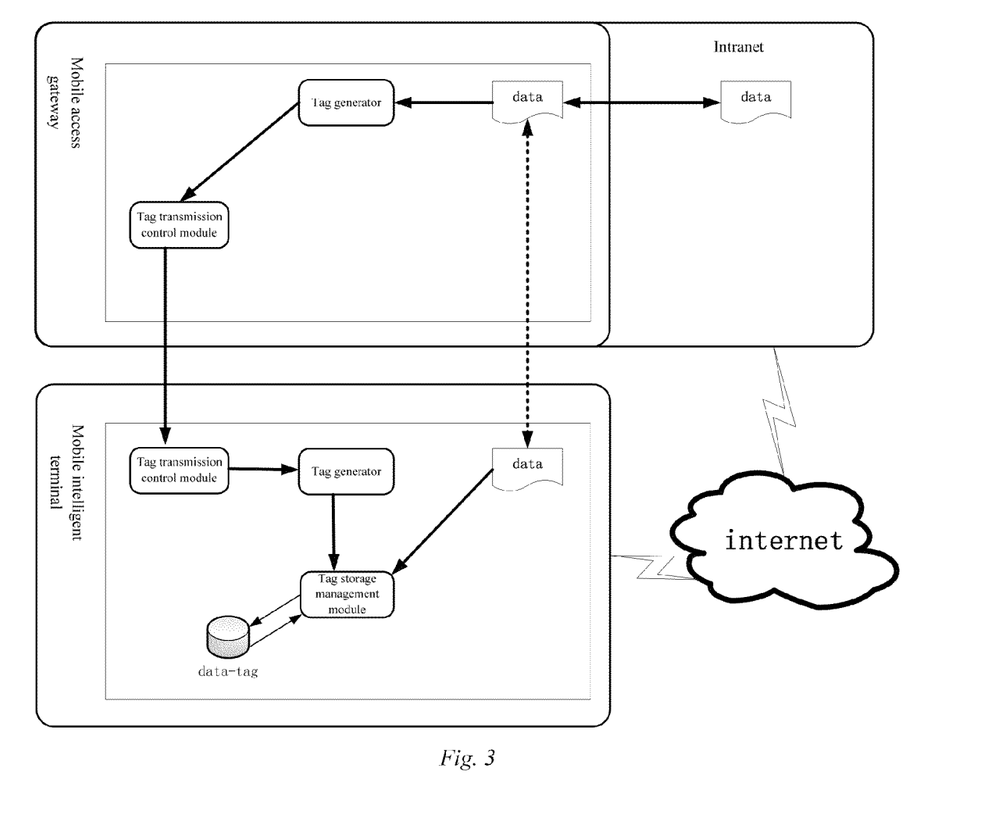
FIG. 3 is a data-tag transmission management schematic diagram.

FIG. 3 is a data-tag transmission management schematic diagram. In particular:

1. when data needs to be pushed to the terminal, the tag generator is informed at the mobile access gateway to generate a data-tag, and the tag transmission control module is informed;
2. the tag transmission control module encrypts the tag (data-tag), informs a security control module in a data transmission process in a mobile data management module, and sends same to a mobile intelligent terminal together with the corresponding data in a secure way;
3. the mobile intelligent terminal receives the data and the data-tag, then invokes the tag transmission control module for decryption, and informs the tag generator thereafter;
4. the tag generator acquires a data storage address from a security isolation module in the data storage in the mobile data management module, generates a final data-tag and informs a tag storage management module.
5. the tag storage management module stores the data-tag in a data-tag database.

Figure 4:
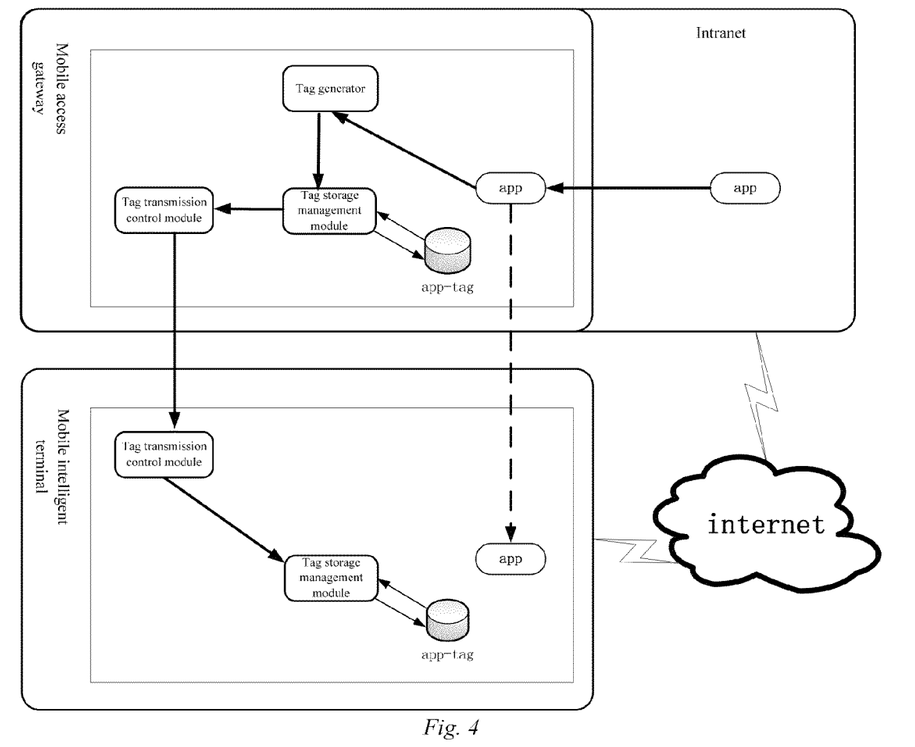
FIG. 4 is an app-tag creation transmission management schematic diagram.

FIG. 4 is an app-tag transmission management schematic diagram, in particular:

when a certain enterprise is about to create a new application:

1. when a certain enterprise is about to create a new application and push same to the terminal, the tag generator is informed at the mobile access gateway to generate an app-tag, and the tag storage management module is informed;
2. the tag storage management module stores the generated app-tag in the app-tag database and informs the tag transmission control module;
3. the tag transmission control module encrypts the tag (app-tag), and sends same together with the corresponding app to the mobile intelligent terminal in a secure way;
4. the mobile intelligent terminal receives the pushed app and app-tag, then invokes the tag transmission control module for decryption, and informs the tag storage management module thereafter; and
5. the tag storage management module stores the app-tag in the app-tag database.

In addition, when the information about the application tag already created by the enterprise is about to change:

1. when the information about the application tag already created by the enterprise is about to change, the tag generator is informed at the mobile access gateway to modify the app-tag, and the tag storage management module is informed;

2. the tag storage management module updates the modified app-tag at the app-tag database and informs the tag transmission control module;

3. the tag transmission control module encrypts the tag (app-tag), and transmits same to the mobile intelligent terminal in a secure way;

4. the mobile intelligent terminal receives the modified app-tag, then invokes the tag transmission control module for decryption, and informs the tag storage management module thereafter; and 5. the tag storage management module updates the modified app-tag at the app-tag database.

The mobile data management module primarily identifies user authority and data confidentiality level according to a tag, and operates and controls the mobile application of mobile data, so as to realize fine-grained confidentiality security protections of the mobile data. The mobile data management module is divided into security isolation control of a data processing process, security control of a data transmission process and security isolation control in data storage.

The security isolation control of the data processing process is realized on a mobile intelligent terminal and a mobile access gateway. Different situations of data processing are respectively expressed as follows.

Data processing has the following situations:

TABLE 2

Data processing table

| Serial number | Trigger state | Operation |
|---|---|---|
| 1 | Data encryption/ decryption | If the data encryption and decryption occur at the mobile intelligent terminal, an authority confirmation algorithm is invoked to confirm whether the user has the authority to operate on the data using an encryption and decryption mobile application. If no, the operation is denied; and if yes, the data is encrypted or decrypted according to "app. confidentiality level", so as to continue the next step. |
| 2 | Data sharing | Invoking the authority confirmation algorithm to confirm whether the user has the authority to share the data. If no, the operation is denied; and if yes, the next step continues. |
| 3 | Data destruction | Invoking the authority confirmation algorithm to confirm whether the user has the authority to destroy the data. If no, the operation is denied; and if yes, the data is destroyed, and the tag storage management module deletes the corresponding data-tag. |
| 4 | Data modification | Invoking the authority confirmation algorithm to confirm whether the user has the authority to operate on the data using this mobile application. If no, the operation is denied; and if yes, the data is modified, and the tag storage management module is informed to modify the corresponding data-tag. |
| 5 | Data replication (full replication) | Invoking the authority confirmation algorithm to confirm whether the user has the authority to replicate the data. If no, the operation is denied; and if yes, the data is replicated, and the tag generator is informed to create a data-tag. |
| 6 | Data backup | Invoking the authority confirmation algorithm to confirm whether the user has the authority to back up the data. If no, the operation is denied; and if yes, the data is backed up, and the tag generator is informed to create a data-tag. |
| 7 | Partial replication (replicate a part of data) | A function whereby the mobile device is inhibited to replicate a part of the data. |

TABLE 2-continued

Data processing table

| Serial number | Trigger state | Operation |
|---|---|---|
| 8 | Data creation | The tag generator is informed to create a data-tag. |
| 9 | Data merge | Invoking the authority confirmation algorithm to confirm whether the user has the authority to operate on merged data using this mobile application. If no, the operation is denied; and if yes, the data is merged. The tag generator is informed to create a data-tag. |
| 10 | Data transfer | If data transfers in the current mobile intelligent terminal, the operation is allowed, and the tag storage management module is informed to modify the corresponding data-tag; and if the data transfers from the mobile intelligent terminal to the exterior, the authority confirmation algorithm is invoked to confirm whether the user has the authority to perform this transfer operation on the data. If no, the operation is denied; and if yes, the security control module in the data transmission process is invoked to transfer the data out of the device. |

The particular steps of the authority confirmation algorithm used in the data processing process are as follows:

input: the app-tag and the data-tag; output: Yes or No 1. viewing the "app. operation authority", and reading the data confidentiality level at which a user operates when using this app;

2. viewing all the "data-tag. data-use authorities", and reading the highest data-use authority; and 3. comparing the level of the "app. operation authority" with that of the highest "data-tag. data-use authority"; if the former is greater than or equal to the latter, returning Yes; and if the former is smaller than the latter, returning No.

The security control of the data transmission process comprises data security control performed in two situations of a process whereby the data is transmitted from the mobile access gateway to the mobile intelligent terminal and of a process whereby the data is transmitted from the mobile intelligent terminal to the exterior.

The particular steps of transmitting the data from the mobile access gateway to the mobile intelligent terminal are as follows:

1. transmitting the data from an intranet to a security isolation storage area of the mobile access gateway, and informing the tag generator of the tag control management module and waiting for a tag generator feedback message;

2. acquiring the tag generator feedback message (corresponding data-tag), and then selecting an appropriate encryption method and transmission method according to the "data-tag. confidentiality level"; and 3. coordinating with the tag control management module, and sending the data together with the corresponding data-tag to the mobile intelligent terminal.

The particular steps of transmitting the data from the mobile intelligent terminal to the exterior are as follows:

1. receiving a data transmission application of the mobile intelligent terminal, then informing the tag storage management module of the tag control management module, and returning, from the data-tag database, a data-tag tag corresponding to the data;

2. invoking the authority confirmation algorithm of the security control module in the data processing process, and judging whether the user has the authority to perform this transmission operation; and 3. if yes, selecting an appropriate encryption method and transmission method according to the "data-tag. confidentiality level" to transfer the data out of the device.

The security isolation control in the data storage isolates static data on a mobile terminal. If a data access message notification is received, a security isolation control module in the data processing process is informed immediately; and if a data transmission message notification is received, a security control module in the data transmission process is informed immediately.

Figure 5:
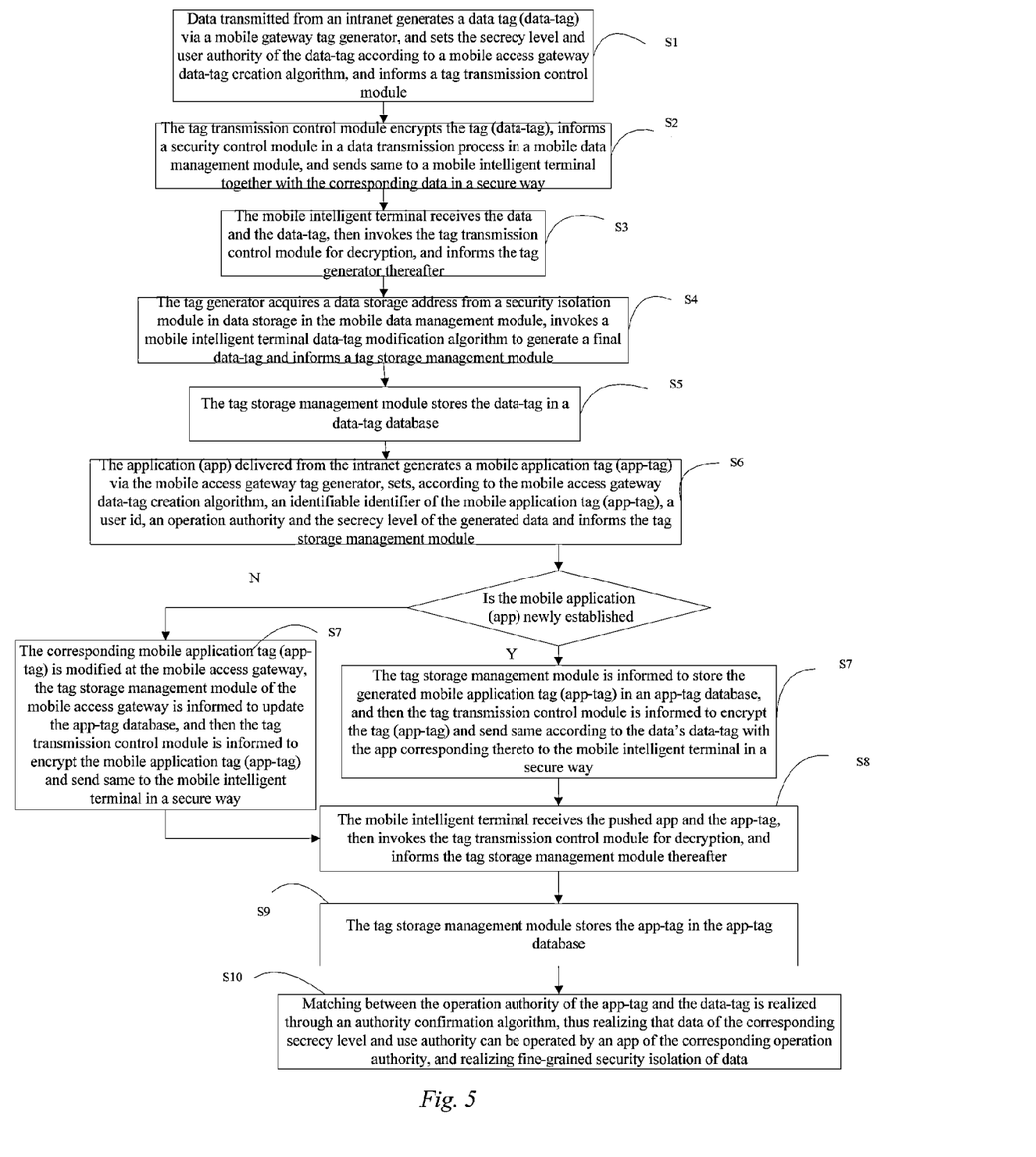
FIG. 5 is a flow chart of a method for mobile data isolation.

In addition, a method for mobile data isolation is also provided in the present disclosure; as shown in FIG. 5, the method creates a confidentiality level and use authority of data by generating a data tag (data-tag), and generates a mobile application tag (app-tag) when a mobile application (app) is pushed out; and the mobile application (app) is also provided with a corresponding operation authority, which realizes matching between the operation authority of the mobile application tag (app-tag) and the data tag (data-tag) via an authority confirmation algorithm, thus realizing that data of the corresponding confidentiality level and use authority can be operated by a mobile application (app) of the corresponding operation authority and realizing fine-grained security isolation of data. The particular steps of the method are:

S1: data transmitted from an intranet generates a data tag (data-tag) via a mobile gateway tag generator, and sets the confidentiality level and user authority of the data-tag according to a mobile access gateway data-tag creation algorithm, and informs a tag transmission control module;

S2: the tag transmission control module encrypts the tag (data-tag), sends it to a mobile intelligent terminal in the most secure way, and then informs a security control module in a data transmission process in a mobile data management module to encrypt the data correspondingly according to the confidentiality level indicated by the data-tag of the data and send same to the mobile intelligent terminal in a corresponding secure way according to the confidentiality level indicated by the data-tag;

S3: the mobile intelligent terminal receives the data and the data-tag, then invokes the tag transmission control module for decryption, and informs the tag generator thereafter;

S4: the tag generator acquires a data storage address from a security isolation module in data storage in the mobile data management module, invokes a mobile intelligent terminal data-tag modification algorithm to generate a final data-tag and informs a tag storage management module;

S5: the tag storage management module stores the data-tag in a data-tag database;

S6: the application (app) pushed out from the intranet generates a mobile application tag (app-tag) via the mobile access gateway tag generator, sets, according to the mobile access gateway app-tag creation algorithm, an identifiable identifier (id) of the mobile application tag (app-tag), a user id (user-id), an operation authority and the confidentiality level of the generated data and informs the tag storage management module;

S7: if the mobile application (app) is newly created, the tag storage management module is informed to store the generated mobile application tag (app-tag) in an app-tag database, and then the tag transmission control module is informed to encrypt the tag (app-tag) and send same together with the app corresponding thereto to the mobile intelligent terminal in a secure way; if the mobile application (app) changes, the corresponding mobile application tag (app-tag) is modified at the mobile access gateway, the tag storage management module of the mobile access gateway is informed to update the app-tag database, and then the tag transmission control module is informed to encrypt the mobile application tag (app-tag) and send same to the mobile intelligent terminal in a secure way;

S8: the mobile intelligent terminal receives the pushed app and app-tag, then invokes the tag transmission control module for decryption, and informs the tag storage management module thereafter;

S9: the tag storage management module stores the app-tag in the app-tag database; and S10: matching between the operation authority of the app-tag and the data-tag is realized through an authority confirmation algorithm, thus realizing that data of the corresponding confidentiality level and use authority can be operated by an app of the corresponding operation authority, and realizing fine-grained security isolation of data.

The tags in the embodiments of the present disclosure are stored in the data-tag database and the app-tag database; in addition, the data-tags can also be directly bound with the data, and the app-tags are bound with the mobile applications, realizing the security isolation of mobile data; however, this goes against the concentrated protection and management of tags, and in this case, the risk that tags are leaked is high and possibilities that the tags are imitated and modified will also increase; and once the security of the tags cannot be ensured, the security isolation protection of the data will not be ensured either.

The embodiments of the present invention can effectively isolate data on a mobile intelligent terminal, ensuring the confidentiality security of the mobile data. By means disclosed herein, fine-grained operation and control of data on a mobile intelligent terminal can be performed effectively, realizing different confidentiality policies. The data on the mobile intelligent terminal can be authorized, according to different confidentiality levels, to the mobile applications of corresponding operation authority to operate, ensuring data isolation effectively. At the same time, distinct encryption and transmission policies are realized according to the different confidentiality levels of the data on the intelligent terminal, utilizing the limited calculation resources of the mobile intelligent terminal effectively.

A system and method for mobile data isolation provided in the embodiments disclosed herein is introduced in detail above; the theory and implementations of those embodiments are described using particular examples; and the descriptions of the above-mentioned embodiments are only for helping to illustrate the core concept thereof. At the same time, for those skilled in the art, according to the techniques disclosed herein, changes can be made to particular implementations and the application scope. In summary, the contents of the present description should not be understood as a limit the protective scope.

The invention claimed is:

1. A system for mobile data isolation, characterized in that the system comprises a tag control management circuit and a mobile data management circuit; the tag control management circuit comprises a tag generator circuit, a tag storage management circuit and a tag transmission control circuit;

the tag generator circuit comprises a data tag (data-tag) generator and a mobile application tag (app-tag) generator, and the tag storage management circuit is informed after generation or change of a data tag (data-tag) and a mobile application tag (app-tag) is completed;

the tag storage management circuit is configured to store the data tag (data-tag) and the mobile application tag (app-tag);

the tag transmission control circuit comprises transmission management of the data-tag and transmission synchronization management of the app-tag;

the mobile data management circuit identifies user authority and data confidentiality level according to the data-tag, and operates and controls the mobile application of mobile data, so as to realize fine-grained confidentiality security protection of the mobile data;

the mobile data management circuit is divided into security isolation control of a data processing process, security control of a data transmission process and security isolation control in data storage;

the security isolation control of the data processing process is realized on a mobile intelligent terminal and a mobile access gateway;

the security control of the data transmission process comprises data security control performed in two situations of a process whereby the data is transmitted from the mobile access gateway to the mobile intelligent terminal and of a process whereby the data is transmitted from the mobile intelligent terminal to the exterior; and the security isolation control in the data storage isolates static data on a mobile terminal; in response to a data access message notification is received, a security isolation control circuit in the data processing process is informed immediately; and in response to a data transmission message notification is received, a security control circuit in the data transmission process is informed immediately.

2. The system as claimed in claim 1, characterized in that the tag storage management circuit is also responsible for the operation maintenance of three databases of a mobile device data-tag database, a mobile device app-tag database and a mobile access gateway app-tag database.

3. The system as claimed in claim 1, characterized in that the data tag (data-tag) generator is responsible for generating a tag for the mobile data, and is divided into two portions of a mobile intelligent terminal data-tag generator and a mobile access gateway data-tag generator; and a data-tag database is provided at the mobile intelligent terminal, and no data-tag database is provided at the mobile access gateway; and the mobile application tag (app-tag) generator is primarily responsible for generating a tag for the mobile application, and is divided into two portions of a mobile intelligent terminal app-tag generator and a mobile access gateway app-tag generator; and both of the mobile intelligent terminal and the mobile access gateway have an app-tag database.

4. The system as claimed in claim 3, characterized in that the mobile intelligent terminal data-tag generator is responsible for creating and modifying a data-tag for corresponding data at the mobile intelligent terminal; and the mobile access gateway data-tag generator is responsible for directly transmitting the data to the mobile terminal, without storing same in the database, after the data-tag corresponding to the data is generated at the mobile access gateway.

5. The system as claimed in claim 3, characterized in that the mobile application tag (app-tag) can only be modified at the access gateway, and is then encrypted and pushed to a corresponding mobile intelligent terminal user after being modified; and the mobile intelligent terminal does not make any modification to the app-tag.

6. The system as claimed in claim 1, characterized in that the data-tag transmission management is responsible for processing the data-tag synchronously encrypted and transmitted with the corresponding data; the app-tag transmission synchronization management is divided into app-tag creation transmission management and app-tag synchronization transmission management, is responsible for processing the app-tag synchronously encrypted with a corresponding application and transmits the app-tag to the mobile intelligent terminal used by "app. user id using the app" designated by that tag; and the tag transmission is one-way transmission from the mobile access gateway to the mobile intelligent terminal.

7. The system as claimed in claim 1, characterized in that the particular steps of an authority confirmation algorithm used in the data processing process are as follows:

input: the app-tag and the data-tag; output: Yes or No
1. viewing "app. operation authority", and reading the data confidentiality level at which a user operates using the app;
2. viewing all the "data-tag. data-use authorities", and reading the highest data-use authority; and
3. comparing the level of the "app. operation authority" with that of the highest "data-tag. data-use authority"; if the former is greater than or equal to the latter, returning Yes; and if the former is smaller than the latter, returning No.

8. The system as claimed in claim 1, characterized in that the particular steps of transmitting the data from the mobile access gateway to the mobile intelligent terminal are as follows:

transmitting the data from an intranet to a security isolation storage area of the mobile access gateway, and informing the tag generator of the tag control management circuit and waiting for a tag generator feedback message;

acquiring the tag generator feedback message, and then selecting an appropriate encryption method and transmission method according to the "data-tag. confidentiality level"; and coordinating with the tag control management circuit, and sending the data together with the corresponding data-tag to the mobile intelligent terminal;

the particular steps of transmitting the data from the mobile intelligent terminal to the exterior are as follows:

receiving a data transmission application of the mobile intelligent terminal, then informing the tag storage management circuit of the tag control management circuit, and returning, from the data-tag database, a data-tag tag corresponding to the data;

invoking the authority confirmation algorithm of the security control circuit in the data processing process, and judging whether the user has the authority to perform this transmission operation; and if yes, selecting an appropriate encryption method and transmission method according to the "data-tag. confidentiality level" to transfer the data out of the device.

9. A method for mobile data isolation, characterized in that the method creates a confidentiality level and use authority of data by generating a data tag (data-tag), and generates a mobile application tag (app-tag) when a mobile application (app) is pushed out, and the mobile application (app) is also provided with a corresponding operation authority, which realizes matching between the operation authority of the mobile application tag (app-tag) and the data tag (data-tag) via an authority confirmation algorithm, thus realizing that data of the corresponding confidentiality level and use authority can be operated by a mobile application (app) of the corresponding operation authority and realizing fine-grained security isolation of data; said method comprising the following steps:

S1: generating, by a tag generator in a mobile access gateway, a data tag (data-tag) for data transmitted from an intranet, and setting the confidentiality level and user authority of the data-tag according to a mobile access gateway data-tag creation algorithm, and informing a tag transmission control circuit;

S2: encrypting the tag (data-tag), by the tag transmission control circuit, and sending it to a mobile intelligent terminal in a secure way from the mobile access gateway, and then informing a security control circuit in a data transmission process in a mobile data management circuit to encrypt the data correspondingly according to the confidentiality level indicated by the data-tag of the data and sending the data to the mobile intelligent terminal from the mobile access gateway in a corresponding secure way according to the confidentiality level indicated by the data-tag;

S3: receiving, by the mobile intelligent terminal, the data and the data-tag transmitted from the mobile access gateway, then invoking the tag transmission control circuit for decryption, and informing the tag generator thereafter;

S4: acquiring, by the tag generator, a data storage address from a security isolation circuit in the data storage in the mobile data management circuit, invoking a mobile intelligent terminal data-tag modification algorithm to generate a final data-tag and informing a tag storage management circuit;

S5: storing, by the tag storage management circuit, the data-tag in a data-tag database;

S6: generating by the application (app) pushed out from the intranet, a mobile application tag (app-tag) via the tag generator in the mobile access gateway, and setting, according to the mobile access gateway app-tag creation algorithm, an identifiable identifier of the mobile application tag (app-tag), a user id, an operation authority and the confidentiality level of the generated data and informing the tag storage management circuit;

S7: in response to the mobile application (app) is newly created, storing, by the tag storage management circuit, the generated application tag (app-tag) in an app-tag database, and then encrypting, by the tag transmission control circuit, the tag (app-tag) and sending same together with the app corresponding thereto to the mobile intelligent terminal in a secure way from the mobile access gateway; in response to the mobile application (app) changes, modifying the corresponding mobile application tag (app-tag) at the mobile access gateway, updating, by the tag storage management circuit of the mobile access gateway, the app-tag database, and then encrypting, by the tag transmission control circuit, the mobile application tag (app-tag) and sending same to the mobile intelligent terminal in a secure way from the mobile access gateway;

S8: receiving, by the mobile intelligent terminal, the pushed app and the app-tag transmitted from the mobile access gateway, then invoking the tag transmission control circuit for decryption, and informing the tag storage management circuit thereafter;

S9: storing, by the taq storage management circuit, the app-tag in the app-tag database; and S10: matching between the operation authority of the app-tag and the data-tag is realized through the authority confirmation algorithm, thus realizing that data of the corresponding confidentiality level and use authority can be operated by an app of the corresponding operation authority, and realizing fine-grained security isolation of data.

10. The method as claimed in claim 9, characterized in that the particular steps of the authority confirmation algorithm are:

input: the app-tag and the data-tag; output: Yes or No;

viewing "app. operation authority", and reading the data confidentiality level at which a user operates using the app;

viewing all the "data-tag. data-use authorities", and reading the highest data-use authority;

comparing the level of the "app. operation authority" with that of the highest "data-tag, data-use authority"; if the former is greater than or equal to the latter, returning Yes; and if the former is smaller than the latter, returning No;

realizing creation and modification for the data-tag of corresponding data of the mobile intelligent terminal respectively via a mobile intelligent terminal data-tag generator creation algorithm and a mobile intelligent terminal data-tag generator modification algorithm;

situations of using the mobile intelligent terminal data-tag generator creation algorithm:

scenarios of generating data, merging data, replicating data and backing up data:

generating data and merging data—according to the application "app-tag. confidentiality level of the generated data" which operates the data, selecting the highest confidentiality level from the "tag. confidentiality levels" of all the data read by the application which operates the data as the "tag. confidentiality level" of the generated data; the position of the new data is recorded to the "tag. data storage address"; and the "tag. user authority" adopts the smallest authority level according to the "tag. user authority" of all the data used by the application, and if there is no data being used, the "tag. user authority" is set as an authority whereby the current user can read and write;

replicating data and backing up data—creating a new data-tag, and recording the position of the new data to the "tag. data storage address"; replicating the "tag. confidentiality level" of the original data; and replicating the "tag. user authority" of the original data;

the mobile intelligent terminal data-tag generator modification algorithm:

situations of using the modification algorithm: scenarios of receiving data from the mobile gateway, modifying the original data, and data being transferred in the current device;

receiving data from the mobile gateway—filling the "tag. data storage address";

modifying the original data—the "tag. confidentiality level" of the original data determines that the "tag. confidentiality level" of the new data (which adopts the highest level) according to the application "app-tag. confidentiality level of the generated data" which operates the data; others are unchanged; and being transferred in the current device—modifying the "tag. data storage address".

* * * * *